United States Patent
Green

[11] 3,738,152
[45] June 12, 1973

[54] POINTERS, DIALS, AND METHOD OF CALIBRATING DIALS FOR MEASURING INSTRUMENTS

[75] Inventor: Talmage O. Green, Schaumburg, Ill.

[73] Assignee: Snap-on Tools Corporation, Kenosha, Wis.

[22] Filed: Sept. 8, 1969

[21] Appl. No.: 862,615

[52] U.S. Cl. .................................. 73/1 A, 73/1 C
[51] Int. Cl. ...................... G01l 25/00, G01d 18/00
[58] Field of Search.................... 73/1 A, 1 C, 432, 73/139; 116/129 A, 129 B, 136.5

[56] References Cited
UNITED STATES PATENTS

| | | | |
|---|---|---|---|
| 2,001,335 | 5/1935 | Urfer | 73/1 A |
| 2,136,364 | 11/1938 | Lincoln | 73/432 |
| 2,159,373 | 5/1939 | Dunn | 73/139 |
| 2,312,104 | 2/1943 | Larson | 73/139 |
| 2,632,421 | 3/1953 | Perkins | 73/432 |
| 1,523,305 | 1/1925 | Spiro | 116/136.5 |

*Primary Examiner*—S. Clement Swisher
*Attorney*—Harry C. Alberts

[57] ABSTRACT

Improved mechanical dial pointers and methods of calibrating dials for precise measuring instrumentalities wherein the mechanical pointer operating linkage moving in a non-linear path, is compensated to reflect the action of their equivalent movements in a linear direction, and take into account the yield in the load applying member. The effective non-linearity of the mechanical linkage between the applied turning load in fastening or loosening fasteners and the meter operating linkage, however small, is caused by an ever increasing linkage angle of movement as such approaches the extremes of displacement around a meter dial. The compensations for the non-linear movement of the linkage are arrived at trigonometrically by resort to the mechanical secant which has a direct relationship with the equivalent arc of movement of any given angle of mechanical linkage movement from zero to their extreme angle of displacement to rotate a calibrated dial pointer within its range for any calibrated dial measuring capacity. The standard method of calibrating measuring meter dials involve uniform graduations of the entire 360° range of a complete circle, but this method is not sufficiently accurate for the state reasons. By utilizing the trigonometric functions of secants, the dial graduations will be farther apart at the full extreme dial scale than at the lower or near zero range of mechanical linkage movements with proportional secant variations between these extremes which also take into account yield in the load applying member. This more closely matches the actual values applied by trigonometrically using the mathematical secant for greater accuracy in graduating the markings around a calibrated dial to more closely interpret the linear displacement in terms of the equivalent non-linear movements of the mechanical linkage, and by measuring the angularity of the mechanical linkage at the maximum rated capacity of the measuring instrument, this reflects the yield in the load applying member.

10 Claims, 8 Drawing Figures

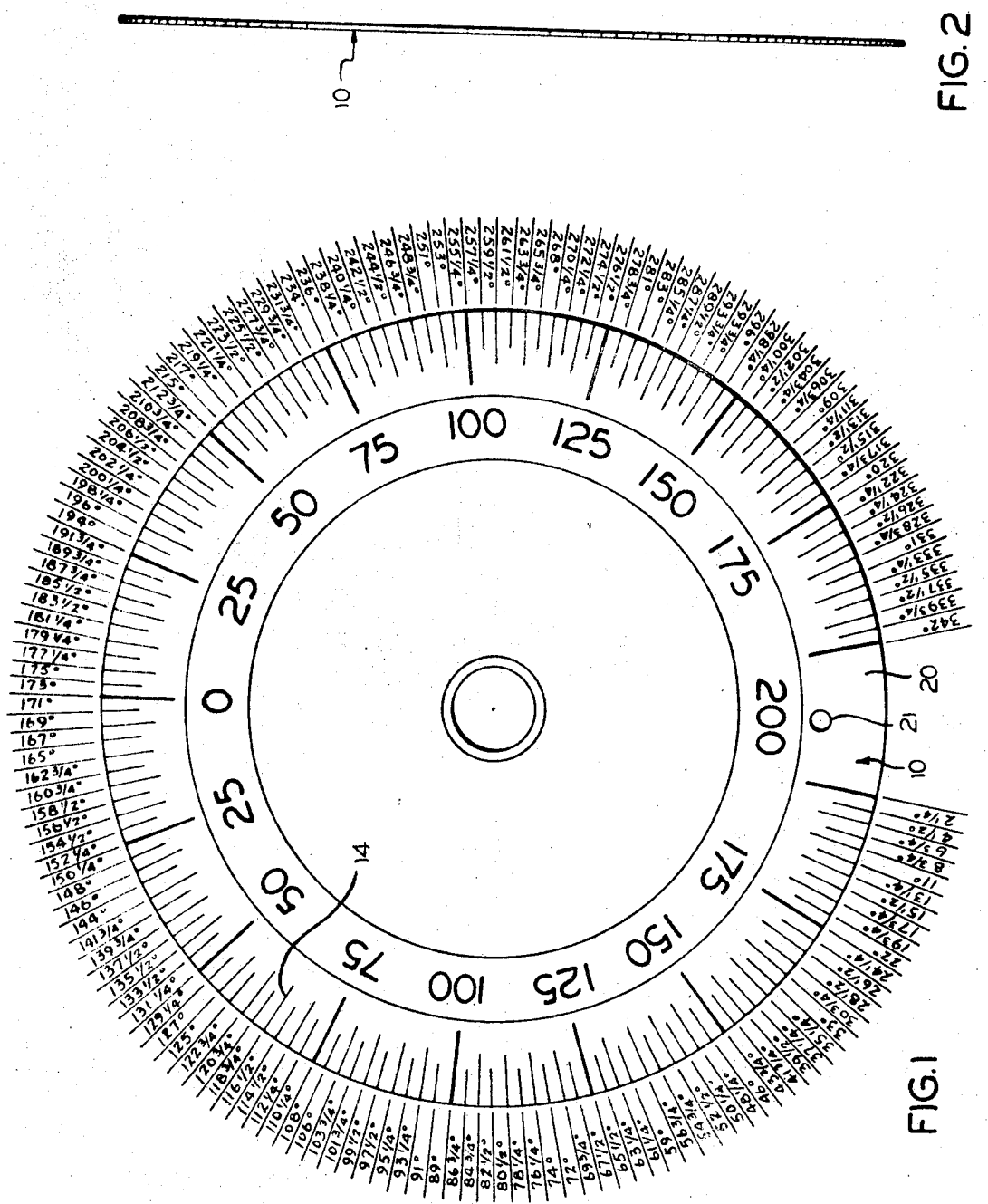

INVENTOR
TALMAGE O GREEN

POINTERS, DIALS, AND METHOD OF CALIBRATING DIALS FOR MEASURING INSTRUMENTS

This invention relates to improved measuring dials and method of calibrating measuring dials for precision measuring instruments and more particularly to a method of compensating for non-linear linkage movements and conforming the calibrations thereof to the effective linear operation in the mechanical dial pointer displacing linkage mechanism.

It contemplates more especially a method of combining mechanical non-linear linkage movements with a minimum of linear functions, and plotting the spacing of calibrations around a dial by utilizing the secant to compensate for the effective non-linearity caused by the linkage which involve these combined movements to actuate a pointer around the scale of graduated dials. This results in dial graduations which more closely match the actual applied loads to conform with the dial pointer movements to compensate for non-linearity involved therein by conforming the dial graduations thereto with trigonometric compensations therein around the entire circumference of pointer displacement. Further, by measuring the maximum angle of displacement of the mechanical linkage between the load applying translating member and the measuring meter linkage connected therewith, the yield in load applying bar or frame is compensated for in utilizing trigonometric secant functions for the applicable maximum angularity.

Virtually all mechanical linkage mechanisms fail to reflect the actions of movement in a linear measureable path; however, most dial readings and their mechanism are linear in their layout. The advantage and function of this concept is to combine a mechanical linkage with a minimum of non-linearity. The dial is specially laid out to eliminate the errors of non-linear movements which exist in mechanical linkage movements contrasted with the true linear layouts of dials.

Space is provided between the first and last graduation on dials beyond the last graduation and before the point of the first graduation on the dials to allow for the post against which the pointer engages at a stop located with reference to an initial setting. There must be space or an allowance to determine the amount of override of the pointer by the operator during the initial calibration of the meter or the measuring unit to determine how far out of calibration the unit is preparatory to the recalibration thereof.

Calibrations on dials of the new configuration are farther apart at the top (full scale) than at the bottom (near zero). This is due to the fact that in the interior meter actuating linkage, there is an increase in the angle of movement as the torque increases (applied turning load) or the angle changes, the efficiency of displacement or ratio of displacement decreases. Further, with the change of the angle of linkage movement, the frame bends minutely and this is taken into account by using the secant but modifying the degree value down or using a lesser value compared to the theoretical needs to compensate for frame yield as the load increases.

The combination of coordinating and compensating for the non-linear moving linkage, and specially graduated dial result in readings which more closely match the actual values applied than has heretofore been possible. The effective non-linearity caused (however small) by the linkage is compensated for by the special calibrations arrive at trionometrically with the use of the standard mathematical secant. The value of the secant takes into account the extreme angle obtained at the full dial reading in conjunction with the other effects to that angle caused by the deflection of the torque wrench frame. This coordinated correction for the usual non-linear movement of the meter actuating elements results in increased efficiency of the mechanical linkage system by off-setting the non-linear effect thereof in displacing the meter pointer by specially placing the markings on the dial trigonomatically through the use of the secant angles based upon the non-linear factors involved. This results in dial markings that are in effective linearity over the range of turning load being applied - the linkage and dial movements are combined as far as they affect the calibrations.

It should be noted that the old method of calibrating dials involved results within an error of 5 percent, but with the instant method now described herein, this is brought within one-quarter per cent error over the entire dial. It was well known that with the known method of calibration of dials (uniform markings over the entire 360° range), the pointer is slow at 25 foot pounds (little over), somewhat slower at 50 foot pounds, little fast at 75 foot pounds, and real fast at 100 foot pounds on a dial of the latter capacity. The secant of the angle compensates for the non-linear effect in the mechanical linkage which is caused by an ever increasing angle of movement at the extremes of movement around a circular path. For explanatory purposes, a secant in trigonometry is a straight line drawn from the center of a circle through one extremity of an arc to the tangent (AB - FIG. 6) from the other extremity of the same arc; now, then, the ratio of this line (AB) to that of the radius of the circle (AC) is the value of the secant for angle (E); hence, of an acute angle of a right angled triangle (ABD), a trigonometric function equal to the ratio of the length of the hypotenuse (AB) to that of the side adjacent to the angle (AC). In geometry, this is termed an intersecting or secant line (AC).

One object of the present invention is to provide an improved method of calibrating pointer measuring dials to reflect the action of non-linear movement of pointer operating mechanical linkage in relation to their effective displacement in a linear dimension.

Another object is to calibrate measuring dials so that the pointer operated mechanical linkage movement is a trigonometric function of the secant involved therein taking into account the maximum angularity thereof at extreme rated turning loads.

Still another object is to utilize the secant for a given non-linear linkage movement for which the device is capacity rated in calibrating a dial therefor, and modifying these by the effect of the outer case or load applying bar elasticity of a given measuring instrument at its rated capacity load such as but not limited to torque measuring wrenches and the like.

A further object is to provide a method of calibrating dials by utilizing the trigonometric function of secants to correct non-linear mechanical linkage functions caused by an ever increasing angle of movement equivalent to translating a pointer around the full scale thereof.

A still further object is to provide a method of calibrating pointer reading dials around the full scale thereof by correlating the non-linear movements of mechanical linkage with the trigonometric secant to provide the equivalent linear function in the pointer displacement mechanism for more accurate readings up to the maximum capacity rating thereof.

Still a further object is to modify otherwise uniform full scale dial graduations to reflect the non-linear action of mechanical linkage used therewith for pointer operation by utilizing corresponding secants to provide full scale accurate graduations and, further, taking into account the effect thereon of outer casing elasticity between no load and full load turning therewith for utmost accurate calibration of measuring instruments.

An additional object is to provide a double-headed pointer which will instantly denote the loading or unloading movements involved in the particular operation thereof so that a full dial can be calibrated for opposite directional applications of loads.

Other objects and advantages will appear from the following description of an illustrated embodiment of the present invention.

In the drawings:

FIG. 1 is a plan view of a dial for a 200 foot pound capacity torque wrench calibrated by utilizing the method and teachings of the invention, and showing the degree variations between the extremes of the calibrations.

FIG. 2 is an edge view in elevation of the dial shown in FIG. 1.

Figure 3:
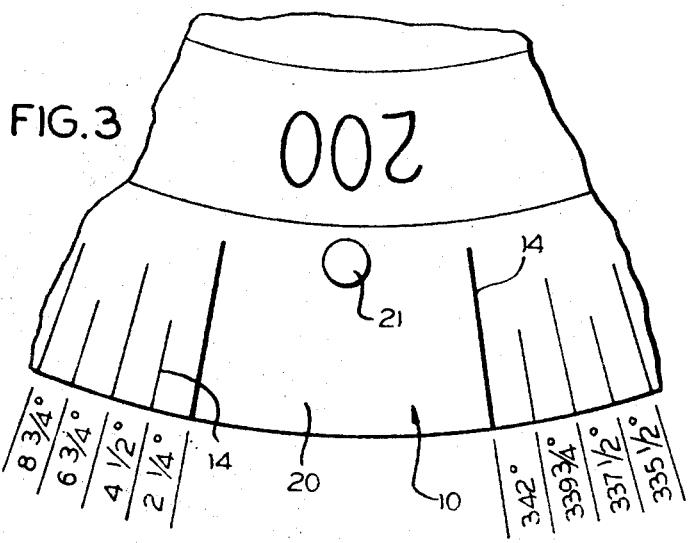
FIG. 3 is an enlarged fragmentary plan view of the dial shown in FIG. 1 to illustrate the space left between the two extremes of calibrations for loading in opposite directions, and the degree variations between graduations in the full extreme of loading of the measuring instrument for fastener tightening or loosening or tightening in opposite directions.

The calibrated dial structure 10 selected for illustration results from a method of arriving at and more accurately calibrating dials 10 for rotary pointer displacement relative thereto whereby mechanical pointer operating linkage 11-12-13 (FIGS. 7 and 8) having combined linear and non-linear functions move commensurately along the graduations taking into account the non-linear linkage movements that are corrected trigonometrically with the modified dial calibrations 14 between extremes representing specially calibrated full scale pointer rotation relative to the graduations on the confronting dial 10 more accurately conforming to the effective non-linear and linear linkage movements in accordance with the teachings of the present invention.

The standard method of calibrating dials involves uniform markings or graduations over the entire range of a complete circle (see U.S. Pat. Nos. 2,312,104 and 2,367,224).

CORRECTIONS FOR FRICTIONAL LAG

Examination of standard torque meter readings, however, taken from test comparisons against standards disclose a non-linearity of readings. A particular jump in the non-linearity occurs adjacent to the zero increment. This latter phenomena can be traced directly to the lag in pointer movement caused by movement friction (gear sector and pinion friction). This lag shows up only adjacent to the zero increment due to the manner in which the calibrated dial is zeroed prior to use or test. The measuring instrument is zeroed in such a way that the pointer comes to rest at zero without friction lag (as if it were vibrated while at rest when the unit is tested or used).

Pressure is applied slowly and deliberately which initiates the frictional lag immediately and this lag should be taken into account as a similar correction factor for all increments. This part of the correction for dials is simply taken care of by moving the zero increment closer to the other reading increments. The amount of correction at zero is dependant most of all on the friction of the movement and on the elasticity of the actuating member that connects to the load translating lever or bar 12. This can most conveniently be determined by tests and varies between 10 minutes to 1° of arc depending on the style of the turning load measuring device. Actually, the load stress is noted between zero and the first graduation, and half of this average is deducted from the vertical zero graduation to compensate for friction in the meter linkage.

Figures 7, 8:
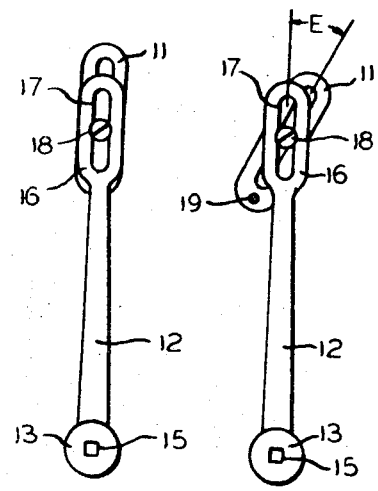
FIG. 7 is a plan view of pointer operating mechanical linkage illustrating the ideal floating position of the load translation bar or lever and its connecting link for explanatory purposes.
FIG. 8 is a plan view of the mechanical linkage illustrated in FIG. 7 with the connecting link at its extreme position of movement representing a full scale pointer displacement relative to the dial in any particular calibrated dial and pointer at its rated capacity for illustration purposes.
Figure 6:
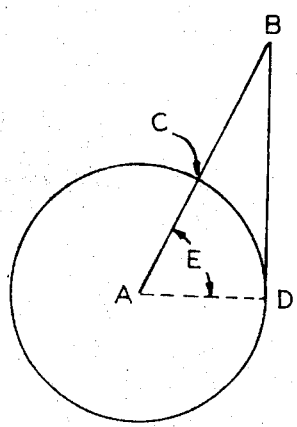
FIG. 6 is a diagrammatic illustration of trigonometric secant relationships to their angle representing the linear and non-linear mechanical linkage combination of movements for explanatory calibration purposes.

By utilizing the trigonometric functions of secants constituting the ratio of (AB) to (AD) for the extreme angle (E) (FIG. 6) of any particular pointer actuating linkage extremes, and calibrating the dials 10 to compensate for the combined linear and non-linear movement effects thereof over the full dial readings, the instrumentalities involve dial mechanisms that produce highly more accurate readings in their applied load measurements by devices such as but not limited to torque wrench meter pointer operating linkage (FIGS. 7 and 8). For a given mechanism such as but not limited to the 200 foot pound dial 10 illustrated herein, the extreme angle of the pointer actuating lever relative to the translation member will be an angle of 26° based upon linkage characteristics for a particular range of capacity such as a 200 foot pound measuring wrench (FIGS. 6, 7 and 8). This angle is physically measured for each capacity involved. For instance, it is found to be 24° for torque measuring wrenches between 300 and 600 foot pounds; 21° for a 200 foot pound torque wrench; 20° for a wrench between 100 foot pound and 200 foot pound torque measuring wrench, and 19° for a 100 foot pound torque measuring wrench. This takes into account the yield in the measuring instrument frame both in the right and left hand or clockwise or counterclockwise direction of loading.

The mechanical linkage 11–12–13 includes the meter pointer mounting pin actuating arm 12 having an axial end boss 13 provided with a polygonal attaching bore 15 to which the work engaging member of the measuring instrument is connected for response to and commensurate with the applied load. The lever 12 has an elongated slotted arm end 16' whose slot 17 confronts the slotted link 11 with an adjustable screw stud 18 therebetween. A screw stud 19 on the end of the slotted arm end 16', is carried by the meter gear sector (not shown—see 60 in U.S. Pat. No. 2,367,224).

The exact placement of the calibrated graduations around the dial 10 can be determined for any segment of the dial 10 by consulting the factor obtained from the secant of the 26° angle (E) (FIGS. 6 and 8). The secant which is the ratio of (AB) to (AD) (FIG. 6) is derived from mathmatical tables expressing natural trigonometric functions, and for the specific angle (E) is the factor 1.1126 which is an angular increase of approximately 11½ per cent. The radial graduations would thus appear on the dial 10 about 11½ per cent farther apart at the full scale or extreme dial reading, in this instance, at the 200 foot pound limit. It is found that the angle of 26° is that angle obtained when a full dial reading is obtained. At this extreme, the factor of non-linearity of the mechanical linkage (illustrated in FIG. 8) can be calculated trigonometrically and applied at every 10 foot pound increment around the dial limit for accurately graduating dials for their full circumferential scale to reflect the discrepancies arising from the indirect linear movements incident to the non-linear direct movements of the mechanical linkage 11–12–13 and error due to the yield in the load applying member.

There is a progressive speeding up of the pointer in relation to increment placement as pressure is increased at the handle. This can be traced to the angle which increases between the contact surface of the actuating member and the adjustable movement post. The correction factors necessary here turn out to be trigonometric in nature. Simple measurements show that a maximum angle of 26° is obtained at the full scale reading of 200 foot pounds. Consulting "Natural Trigonometric Functions" discloses that 26° (considering the secant of the angle) results in a correction factor of 1.1126 or about 11½ per cent increase in space between the full scale increments when compared with those adjacent to zero. This turns out to be too much correction based on tests but the trigonometric functions table works well considering that the apparent overcorrection is traced to bending of the main plate to which the meter movement is attached. The bending causes the movement to contact the actuating member at a new and lesser angle. This could be taken to mean for some purposes that bending of the plate is good because it lessens the factor of correction. At any rate, the per cent of total correction factor required is best determined by tests at every 10 foot pound increment of load using the standard non-corrected dial.

Correction for lag must be determined and omitted from this separate consideration at this time. Once the necessary correction factor is determined, the trigonometric table is consulted to determine the effective greatest angle. This is done by matching the necessary correction with the correct secant. The precise angle then appears to the side of the chart. For example: A necessary correction of plus 0.0946 per cent is the secant 1.0946 which then discloses an effective angle of 24° (see at the side of the chart).

The next step is to break down the chart from that point to zero degrees in as many parts as the number of increments required over the full range on one side of the dial. For example: Increments at 0, 50, 100, 150, and 200 on the 200 foot pound dial 10 would break the chart down into four parts and the result would be notations at 6°, 12°, 18°, and 24°. To procure more exacting graduations, the increments constituting check points from the "Natural Trigonometric Functions" mathematical tables should be recorded for every 10 foot pound graduation which would more accurately compensate for the measuring instrument casing yield.

PLOTTING THE DIAL

It is found convenient in calibrating the dial 10 to leave some space 20 between the full scale reading and the dial post 21. Hence, 360° for both sides of the dial will not be available for readings. The amount of space is rather arbitrary, but it may be assumed that 350° is left for readings leaving 175° per side. If the secant factor will cause the distances to be actually greater between marks, then this also must be considered initially. The average correction factor throughout the dial in the example supra, is about 4 per cent so this must be subtracted from 175° so as to retain proper space between full scale and the dial post after calculations are concluded. Subtracting 4 per cent from 175°, leaves approximately 167°. The 4 increment spaces divided into 167° results in approximately 42° between increments.

It is most convenient to lay out calculations starting with full scale, then progressing through zero up to full scale on the opposite half. Thus, assuring 170° on a side after completion, the full scale mark will begin 5° from the center line.

The next mark will be subject to the full factor of correction because the space between is associated with the greatest amount of contact angle. Therefore, the 42° must be multiplied by the secant factor previously noted in the chart which is 1.0946 corresponding to 24°.

| Example: | 1.0946 = | Secant of 24° |
|---|---|---|
| | × 42 = | Normal ° |
| | 2.1892 | Total |
| | 43 784 | |
| | =45.9732 = | Degrees (fraction) |
| | ×.6 = | Changes fractions to minutes |
| | =45.58392 = | 45°, 58 Minutes. |

The next graduation is calculated in the same manner. The secant factor next previously noted in the chart is from 18° and this is equal to 1.0515.

| Example: | 1.0515 = | Secant of 18°. |
|---|---|---|
| | × 42 = | Normal degrees |
| | 2 1030 | Total |
| | 42 060 | |
| | 44.1630 = | Degrees+(fraction) |
| | ×.6 = | Changes fractions to minutes |
| | 44.9780 = | 44° 9.7 minutes (or) |
| | | 44° 10 Minutes |

All increments are plotted from a single point so that now the new space must be added to the one calculated before.

Example:  45  Degrees  58  Minutes

|   |   |   |   |
|---|---|---|---|
| +44 | Degrees | +10 | Minutes |
| =89 | Degrees | =68 | Minutes |
|  | -or- |  |  |
| 90 | Degrees | 8 | Minutes |

The next graduation is taken from the chart corresponding with 12° which discloses the secant of 1.0223 multiplied by 42 equalling 42.9366 and six-tenths thereof is 42.56196 or 42 degrees 56 minutes.

| Example: | 90 | Degrees | 8 | Minutes | (as shown |
|---|---|---|---|---|---|
|  | +42 | Degrees | +56 | Minutes | supra) |
|  | =132 | Degrees | =64 | Minutes |  |
|  |  | -or- |  |  |  |
|  | 133 | Degrees | 4 | Minutes |  |

Now, because the zero increment must be calculated, the separate factor of lag must be considered as well as the standard determinations. Tests indicate a lag factor of 30 minutes.

Continuing As Before:

Six degrees discloses a secant factor of 1.0055.

| Example: | 1.0055 = |  | Secant of 6° |
|---|---|---|---|
|  | × 42 = |  | Normal ° |
|  | 2 0110 |  |  |
|  | 40 220 |  |  |
|  | =42.2310 = |  | Degrees plus fraction |
|  | × .6 = |  | Changes fractions to minutes |
|  | =42.13860= |  | 42° 14 Minutes |

Now subtract the lag factor of 30 minutes. This equals 41 degrees 44 minutes.

Added to the previously plotted figures, the result is:

| 41 | Degrees | 44 | Minutes |
|---|---|---|---|
| +133 | Degrees | +4 | Minutes |
| =174 | Degrees | =48 | Minutes |

Now add the same factors which have been calculated before - through the other side of the dial.

| Example: | Note: | The lag factor must be taken into consideration on both sides of zero so it will be possible to use the final figure last calculated as follows: |  |  |
|---|---|---|---|---|
|  |  | 174 | Degrees | 48 | Minutes |
|  |  | +41 | Degrees | +44 | Minutes |
|  |  | =215 | Degrees | =92 | Minutes |
|  |  |  | -or- |  |  |
|  |  | 216 | Degrees | 32 | Minutes |

Continuing until the computations and plottings are complete:

| Example: | 216 | Degrees | 32 | Minutes |
|---|---|---|---|---|
|  | + | Degrees | +56 | Minutes * |
|  | =258 | Degrees | =88 | Minutes |
|  |  | -or- |  |  |
|  | 259 | Degrees | 28 | Minutes |

(*) - Calculating this graduation for the same position on the other side of the dial, the result is (**):

| 259 | Degrees | 28 | Minutes |  |
|---|---|---|---|---|
| + 44 | Degrees | +10 | Minutes | **:(see page 13 |
| =303 | Degrees | +38 | Minutes | supra) |

Add the last factor which is the same as the first one calculated because it is from the same position opposite thereto:

| Example: | 303 | Degrees | 38 | Minutes |  |
|---|---|---|---|---|---|
|  | +45 | Degrees | +58 | Minutes | (see page |
|  | =348 | Degrees | =96 | Minutes | 13 supra) |
|  |  | -or- |  |  |  |
|  | 349 | Degrees | 36 | Minutes |  |

Note: When half of the dial is completely plotted, the calculations become easier because factors figured during the first half (½) may be used for similar positions on the second half of the dial. The total number of degrees calculated for and plotted on the first half, should therefore equal half of the total number.

Example: 174 Degrees 48 Minutes × 2
Equals: 349 Degrees 36 Minutes

Figure 4:
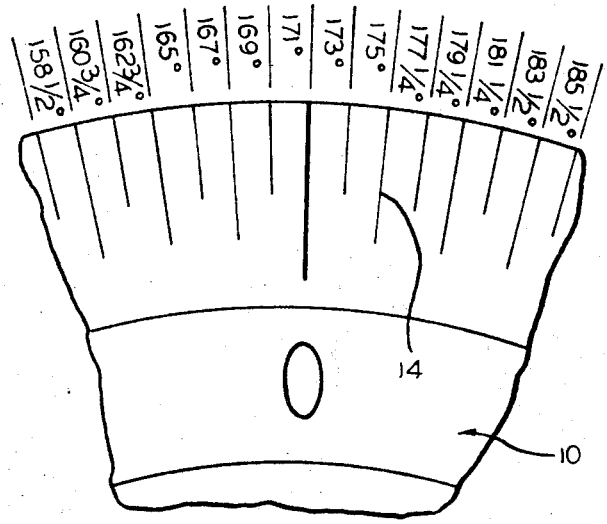
FIG. 4 is an enlarged fragmentary plan view of the dial shown in FIG. 1 to illustrate the degree variations between graduations in the no load and lower extreme of measuring instrument loading.
Figure 5:
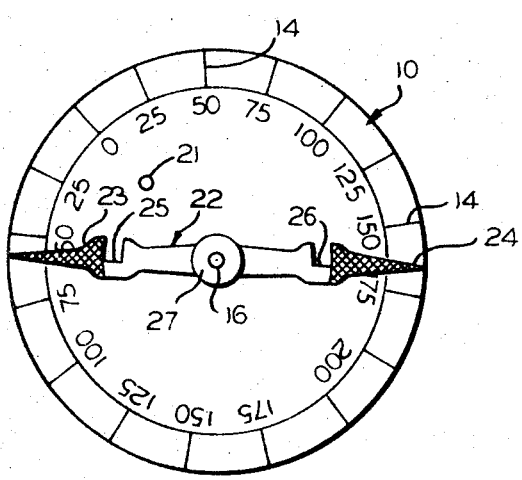
FIG. 5 is a plan view of a dial and special pointer utilizable therewith to instantly show whether or not the instrument is being loaded or unloaded or the direction of loading at any given movement of operation.

Having given representative instances of secant computations for the complete dial 10, the intermediate graduations 14 for a 200 foot pound measuring dial 10 such as used on a torque wrench of that capacity, were plotted for the values set forth opposite each graduation (FIGS. 1, 3 and 4) first by measuring the maximum angle of displacement of the linkage 11-12 relative to each other which was found to be 26° taking into account the yield in the measuring instrument plate which applies the load (the plate 17 in U.S. Pat. No. 2,367,224), and then utilizing the secant for that angle (E - FIG. 6) over the rotary displacement of the meter shaft 16 with its pointer 22 (FIG. 5) in this instance up to 200 foot pounds as calibrated on the dial 10; however, in practice it is more practical to start at the linkage extreme angle coincident with the 200 foot pound graduation and compute for each graduation down to zero from the trigonometric function tables as set forth supra. These tables are found in the Machinery Handbook and elsewhere in mathematical geometry treatises.

In the present embodiment, the pointer 22 is provided with opposite extending pointer tips or heads 23 and 24 at each end thereof. The pointer tips or heads 23-24 have adjacent notches 25-26, respectively, facing and communicating with the same edge of the pointer shank 22 which has a central or axially related hub 27 for frictional mounting on the meter shaft 16 that is operatively connected to the pointer displacing linkage 11-12. The frictional mounting of the pointer hub 27 on the meter shaft 16 enables the meter casing ring (not shown) to be utilized in the manner known in the art for turning the dial 10 with its post 21 in either a clockwise or counterclockwise direction relative to the meter shaft 16. With this construction, the pointer 22 can be reset to an initial zero position for metered turning in either direction from a zero dial position. The pointer 22 is displaced relative to its frictional mounting meter shaft 16 by engagement of the dial pin or post 21 with the manual turning of the dial 10 through the medium of the dial casing ring (not shown) as illustrated and described in U.S. Pat. No. 2,312,104 dated Feb. 23, 1943 (Page 4, Col. 1, lines 1-13). With this arrangement, the dial pin 21 is rotarily displaced with the turning of the dial 10 so that pointer notch 25 or 26 is engaged thereby to reset the pointer 22 in either direction to initially position it for the desired operation. Either pointer head 23 or 24 may so be positioned to an initial zero position depending upon whether or not the applied force to the torque wrench is clockwise or counterclockwise. The pointer notches 25-26 are positioned along the pointer or pointer shank, in this instance the pointer shank 22 in the path of the stop pin 21 so that one pointer tip or head 23 confronts substantially one-half of the dial 10 and registers the foot pounds of applied turning load that is transmitted to the linkage 11-12 by the measuring instrument (not shown) in a counterclockwise direction. The other pointer tip or head 24 confronts substantially the other half of the calibrated dial 10 and registers the foot pounds of applied turning load that is transmitted to the linkage 11-12 by the measuring instrument in a clockwise direction. Thus, nut or other fastener turning can be measured for left and right handed threaded fasteners or for tightening and loosening either left or right handed threaded fasteners.

The notches 25–26 in either event will abut against the stop pin 21 at the load limit or capacity of the measuring instrument, and in visible and/or audible signalling dial meters such as illustrated in U.S. Pat. No. 2,367,224 referred to supra, the stop pin is electrically insulated from the dial 10 and its mount so that upon contact by the pointer notch 25 or 26, the capacity limit approach will be signalled to the user as fully set forth in the aforesaid patent. Where the dial 10 is not provided with a space 20 between zero and the capacity graduation, in this instance 200 foot pounds, the pin 21 may be positioned on the dial inside of the circumferential bank of graduations (FIG. 5) and radially aligned with the full capacity graduation without altering the concept or structural features of the double tipped or headed pointer 22. In that event, the pointer notches 25–26 are provided in the shank 22 (rather than in the pointer tips or heads 23–24) to match the radius of the pin 21.

It should be noted that should commercial practice so dictate, the pointer tips or heads 23–24 may be colored or identified differently as diagrammatically shown double cross-hatched so that the user or observer may know at a glance the directional loading or unloading of the measuring device. For that matter, the designations may take the form of an "on" — "off" inscription on the respective tips or heads 23–24 depending upon the choice of the users or designers.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. A method of calibrating dials to measure applied loads transmitted thereto through linkage movements having combined linear and non-linear components which consists in measuring the maximum angle between the linkage elements under measured loads therefor, then plotting the graduations around the dial between the measured load limits according to the secant values based upon natural trigonometric functions for said maximum angle, and then applying the load values to said graduations corresponding to the spacing thereof around the dial periphery according to said secant values around said dial.

2. A method defined in claim 1 including the step of measur-ing said loads and plotting said graduations between the maximum and minimum load limits based upon linkage secant values for which said linkage and dials are designed.

3. A method defined in claim 2 wherein all applied loads corresponding to the spacing of said graduations are determined from the relative angles of said linkage at predetermined peripheral dial points, and then compensating for load yield therein.

4. A method defined in claim 2 wherein said dial is calibrated oppositely on substantially dial halves to provide for clockwise and counterclockwise measured loading of the dial and linkage.

5. A method defined in claim 3 wherein said dial is calibrated for opposite directional loading and unloading on different areas of said dial.

6. A calibrated measuring dial having separate areas, opposite calibrations on said separate areas, a pin extending from said dial and a pointer mounted to rotate on and relative to an axial shaft, means on said pointer to cooperate with said dial pin to reset said pointer to an initial zero position against said pin on either side of said pointer extending through said dial to rotate and indicate the directional load application commensurate to applied loads to meter linkage operatively connected to said axial shaft.

7. A calibrated measuring dial defined in claim 6 wherein said pointer has a double head extending in opposite directions to confront separate calibrated dial areas to measure oppositely applied loads to said meter linkage.

8. A calibrated measuring dial defined in claim 7 wherein said pointer is notched on both sides of the axial mount thereof, and a pointer stop pin on said dial in the circumferential path of said pointer notches to register with said pin at the extreme measureable value of the applied load in either direction.

9. A calibrated measuring dial defined in claim 8 wherein said pointer notches communicate with the same edge of said pointer to provide for pin registry in opposite loading directions of said meter linkage.

10. A calibrated measuring dial defined in claim 9 wherein each head of said double headed pointer are differently identified to instantly denote the directional loading of said meter linkage.

* * * * *